Nov. 17, 1964 H. D. LOWRY ETAL 3,157,103
VISCOUS SOLUTION PROCESSING DEVICE ADAPTED FOR CONTINUOUS OPERATION
Filed Aug. 9, 1961 7 Sheets-Sheet 1

Harold D. Lowry
George E. Cummins
INVENTORS
BY R. Frank Smith
Steve W. Grembow
ATTORNEYS Harold D. Lowry
George E. Cummins
INVENTORS
BY R. Frank Smith
Steve W. Gremban
ATTORNEYS Nov. 17, 1964 H. D. LOWRY ETAL 3,157,103

VISCOUS SOLUTION PROCESSING DEVICE ADAPTED FOR CONTINUOUS OPERATION

Filed Aug. 9, 1961 7 Sheets-Sheet 3

Harold D. Lowry
George E Cummins
INVENTORS

BY R. Frank Smith
Steve W. Grembow
ATTORNEYS

Harold D. Lowry
George E Cummins
INVENTORS
BY R. Frank Smith
Steve W. Grumban
ATTORNEYS Harold D. Lowry
George E. Cummins
INVENTORS
BY R. Frank Smith
Steve W. Greenbaum
ATTORNEYS Harold D. Lowry
George E. Cummins
INVENTORS
BY R. Frank Smith
Steve W. Greenbaum
ATTORNEYS Harold D. Lowry
George E. Cummins
INVENTORS BY R. Frank Smith
Steve W. Greenbaum
ATTORNEYS

United States Patent Office 3,157,103

Patented Nov. 17, 1964

3,157,103
VISCOUS SOLUTION PROCESSING DEVICE ADAPTED FOR CONTINUOUS OPERATION

Harold D. Lowry and George E. Cummins, Rochester, N.Y., assignors to Eastman Kodak Company, Rochester, N.Y., a corporation of New Jersey Filed Aug. 9, 1961, Ser. No. 130,353
2 Claims. (Cl. 95—89)

This invention relates generally to photographic processing, and more specifically to an improved viscous solution processing device for webs or the like adapted for continuous operation.

It is therefore one of the primary objects of this invention to provide an improved viscous solution processing device for webs or the like that may be operated continuously with little attendance.

Another object of this invention is to provide a viscous solution processing device having a plurality of containers of identical viscous solution which are adapted to be connected to the containers in succession.

A more specific object of the invention is to provide a viscous solution processing device having a coating hopper, a storage container of viscous solution, and air removing means interposed between the two.

The above and other objects and advantages will be apparent from the following description when read in connection with the accompanying drawings, in which.

Figure 1:
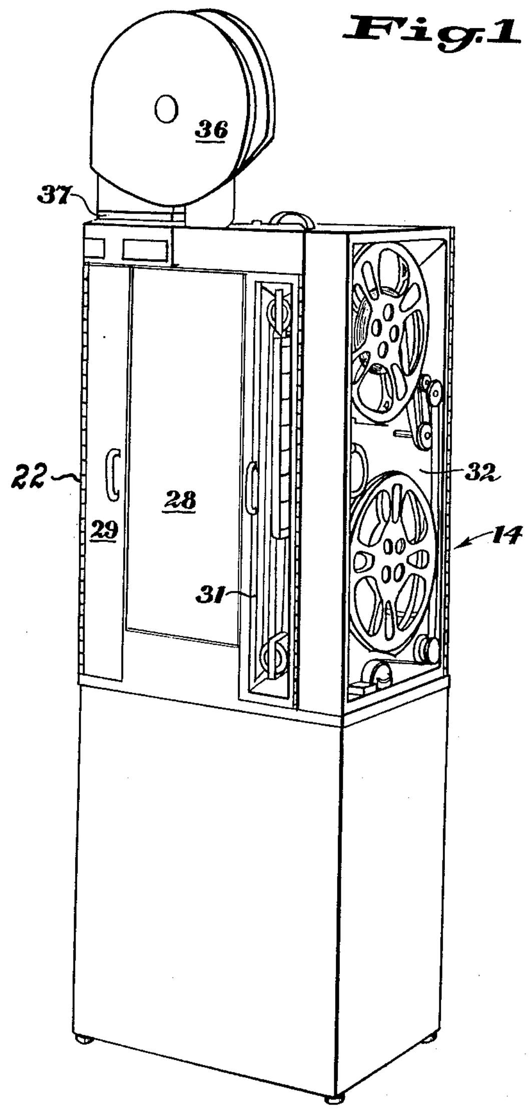
FIG. 1 is a perspective view of a processing machine constructed in accordance with a preferred embodiment of the present invention.

With reference to the drawings, a preferred embodiment of a processing device 14 is disclosed for processing an exposed photographic web material such as black-and-white positive films or the like. This processing device 14 has been use d to successfully process 16 mm. black-and-white positive film at a speed of 36 feet per minute with a dry-to-dry time of 1 minute. Since this speed is equal to the film transport speed of a standard 16 mm. motion-picture camera, it is possible to process the film as fast as it is exposed. This processing device 14 does not utilize the conventional method of processing in which the photopraghic material is totally imersed in the processing solution, and passes successively through tanks of processing solution, but rather employs a processing technique in which layers of viscous developing and fixing solutions thickened with an inert agent, are sequentially applied or extruded through respective coating hoppers 16, 17 onto the emulsion surface of a web 15 of photographic material or the like. The viscous developing and fixing solutions, which are maintained substantially at 125° F. and ambient temperature respectively, are applied to the film 15 in the processing zone which is maintained saturated with water vapor at a temperature of approximately 125° F. The solutions remain on the film for the duration of the process step, and are then removed quickly by jets of water. Since the layers or coatings of solution are in static contact with the emulsion, there is no agitation required and all agitation effects are eliminated. The fact that no agitation exists is compensated for by properly balancing the process chemically. In processing of this type, fresh processing solutions are always used so that the usual problems of seasoning, solution control, replenishment and recovery are eliminated.

The viscous developing and fixing solutions are the normal type of concentrated solutions in which a thickening agent has been added in an amount required to give the solutions the desired viscosity for best results without seriously impairing the chemical properties or diffusion characteristics of the solutions. If the viscosity is too low, the solutions may move on the surface producing "drag" and other undesired effects. If the viscosity is too high, the solutions may be difficult to coat in a uniform layer of the desired thickness. In a process of this type, the viscous developing and fixing solutions for best results should meet the following conditions:

(1) The viscosity must be sufficient to avoid displacement of the layer;

(2) The chemical properties must be such as to obtain required developed image;

(3) The developing and fixing agents must be concentrated to permit the use of thin coatings;

(4) The solutions must be capable of satisfactorily wetting the film and spreading thereon in an even layer with no bubbles.

Figure 12:
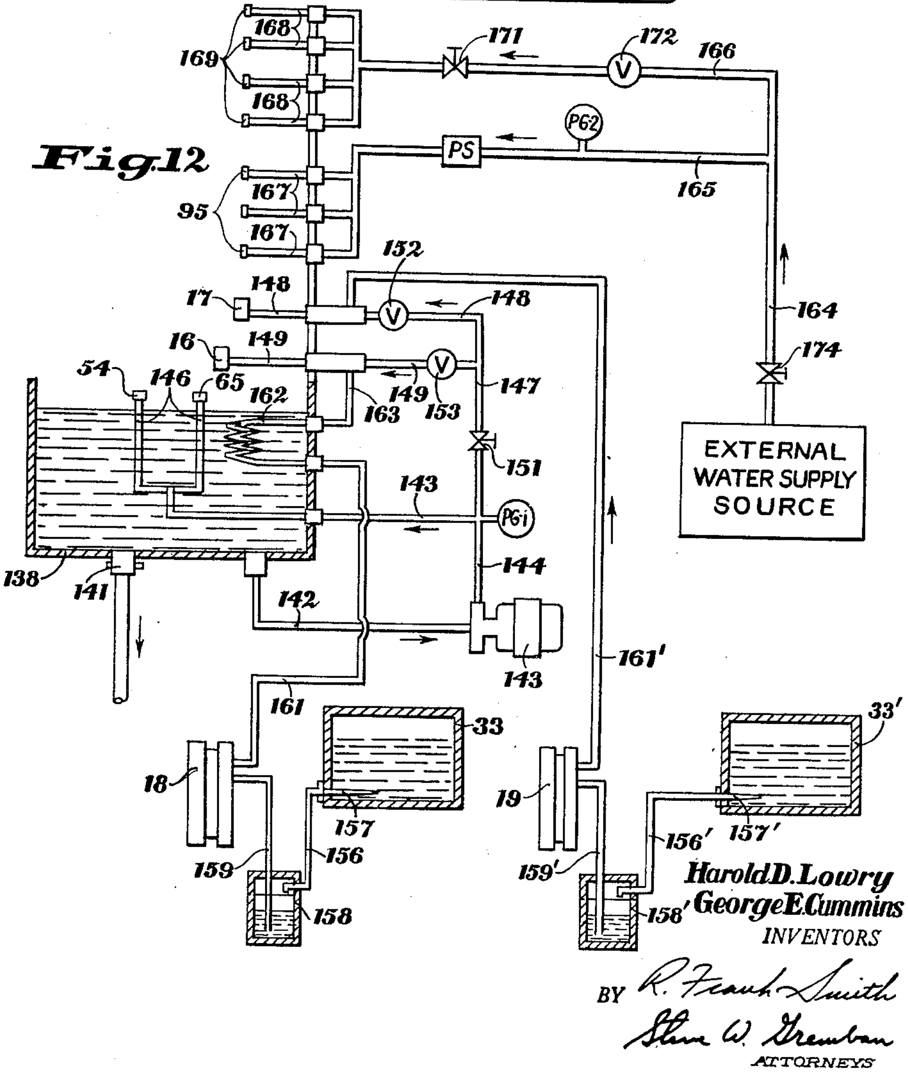
FIG. 12 is a schematic view of the system for feeding the viscous solutions to the processing machine, and for cleaning out the machine prior to processing the material.

The viscous processing solutions for device 14 are preferably packaged in 1-gallon collapsible polyethylene containers 33, 33' as seen in FIG. 12 which can be changed without interrupting the processing operation. The containers 33, 33' are stored in the rear of device 14, and hold a sufficient quantity of solutions to provide approximately five hours of continuous operation without replenishing the supply. If additional containers of solution are added as they are used up, the processing operation can continue indefinitely.

In a process of the type disclosed, the method of coating the viscous solutions on film 15 is very important. For best results, the following conditions have been found to be particularly suitable for applying the viscous solutions to the film:

(1) The viscous solutions should be metered to the coating hoppers at the desired temperature of treatment;

(2) The solutions are applied through the coating hoppers to the upgoing strand of film;

(3) The thickness of the coatings of viscous solutions is maintained slightly in excess of the minimum necessary to obtain full development effect in order to compensate for slight variations in the speed of travel of the web;

(4) The coating hoppers must be accurately spaced from the emulsion surface of the film; and (5) The film speed should be maintained at a uniform value at the point of application of the coatings of viscous solutions.

In the present application, positive-displacement metering pumps 18, 19 discharge the viscous developing and fixing solutions at a predetermined rate through coating hoppers 16, 17 respectively. The surface being coated moves upward past the hoppers at a uniform rate of speed. In this system, the coating thickness may be controlled independently of the solution viscosity. Also, the processing system is closed and hence isolated from the outside atmosphere, to avoid oxidation and evaporation prior to the commencement of a coating operation.

In addition to the conditions mentioned heretofore, for best results there are additional conditions that should be observed during the development period. These conditions are as follows:

(1) The chemical reaction must be carried out in an atmosphere having a constant wet bulb temperature;

(2) There must be no mechanical disturbance of the coating;

(3) Each coating of processing solution must be quickly removed from the film at the termination of a specified processing time, in this instance with a water spray jet; and, (4) The wash water must be removed from the surface of the film by a squeegee or the like prior to the application of a subsequent coating of processing solution.

Coming to the more specific details of the invention and with particular reference to the drawings, processing device 14 comprises a box-like housing 22 including feed, processing, wash, drying and wind-up chambers 23, 24, 25, 26 and 27 respectively. A front panel 28 covers chambers 24 and 25, and three hinged doors 29, 31, 32 close off the respective feed, drying and wind-up chambers 23, 26, 27. The doors 31, 32 have transparent plastic panes to permit the operator to observe the drying and wind-up chambers during operation. This processing device is extremely compact, weighing a little over 300 lbs., and requiring less than 3 square feet of floor space. The basic dimensions of the device are 21½ inches in length, 16 inches in depth and 58 inches in height.

Figure 2:
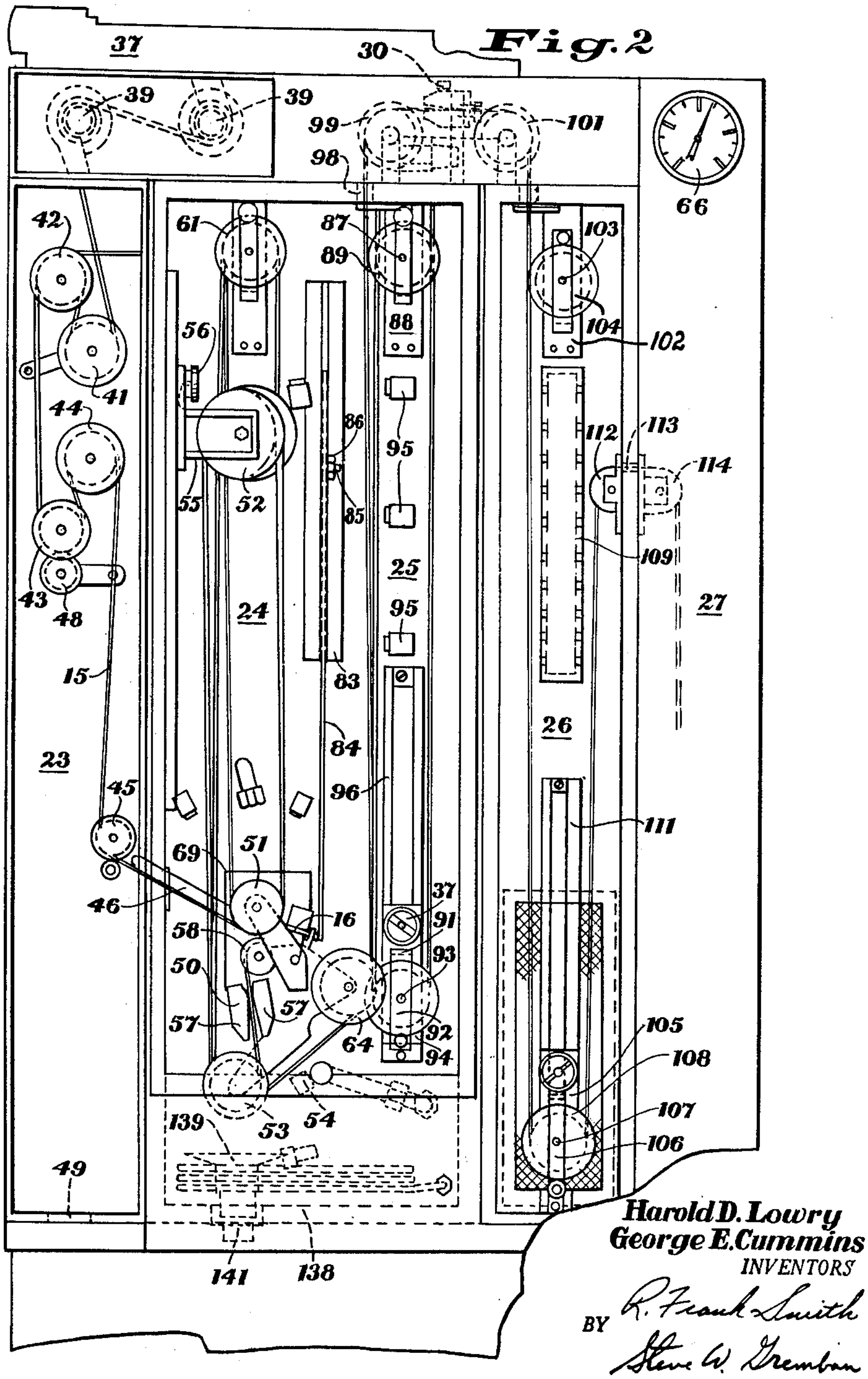
FIG. 2 is an enlarged segmental view of a portion of the machine of FIG. 1 with several doors and a panel removed.
Figure 5:
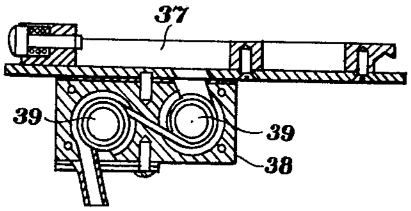
FIG. 5 is an enlarged front sectional view of the light lock mechanism interposed between the magazine and the feed chamber of FIG. 2.
Figure 6:
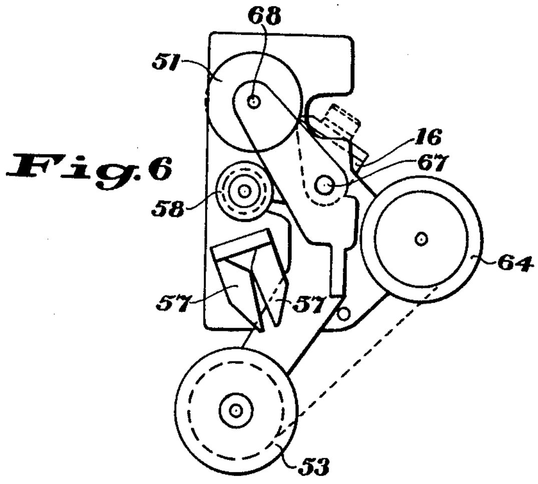
FIG. 6 is an enlarged front elevation view of the viscous solution applicator mechanism and squeegee of FIG. 2.

The path of travel of film 15 through device 14 will now be described. The exposed film 15 is supplied to device 14 from a magazine 36 which is releasably secured to a bracket 37 at the top of the device as seen best in FIGS. 1 and 2. The film 15 is transported from magazine 36 through a light trap 38 as seen in FIGS. 2 and 5 comprising a pair of rollers 39 for directing film 15 through a tortuous path into the top of feed chamber 23. The film 15 as it passes through feed chamber 23 is threaded around a pivotally mounted end-of-roll detector roller 41, an idler roller 42, a rubber-covered pacer or transport roller 43, around another pair of idler rollers, 44, 45, and then exits through a tube 46 into processing chamber 24. The end-of-roll detector roller 41 is movable by film 15, when tensioned, to an upper position closing an end-of-roll detector switch S1, shown in FIG. 13. When the film tension is lost, such as occurs when the film is completely unwound from magazine 36, roller 41 drops down by virtue of gravity opening detector switch S1. The pacer roller 43 which transports the film at a surface speed of 36 feet per minute is driven by a synchronous gear-head motor 47. A pivoted and spring-loaded pressure roller 48 urges film 15 into engagement with the periphery of pacer roller 43. An air vent 49 is located at the lower end of feed chamber 23 through which air is discharged by any suitable blower 51' shown schematically in FIG. 13 into feed chamber 23 for building up a slight air pressure therein to prevent moisture from processing chamber 24 from entering through tube 46.

Figure 7:
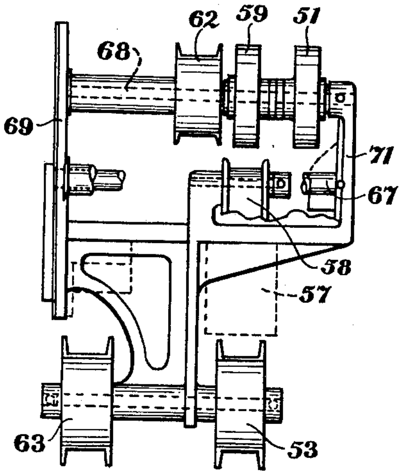
FIG. 7 is a left side elevation view of the structure of FIG. 6.

After entering processing chamber 24, film 15 passes around a developer coating roller 51, and the viscous developing solution is applied to the emulsion surface of film 15 by extrusion coating hopper 16 which will be explained in greater detail hereinafter. After leaving coating roller 51, film 15 passes around an adjustable idler roller 52, a fixed idler roller 53, and then past a high-velocity water spray nozzle 54 which removes the coating of developer solution from the film surface. The developer reaction loop which is formed by rollers 52, 53 is adjustable by raising or lowering idler roller 52 by means of a reciprocally movable bracket 53 and set screw 56 to provide developer times ranging from 2½ to 7 seconds. The axis of idler roller 52 is mounted at a slight angle to that of coating roller 51 so that the helix angle has a minimum effect on the film at the coating point on roller 51 when adjustable roller 52 is in its lowest position. The film 15 then passes through an air squeegee 50 which removes the surface moisture. The air squeegee 50 in this particular application comprises a pair of housings 57 forming a venturi passage through which film 15 is transported, the housings 57 having air slits through which air is directed under pressure against the opposite surfaces of film 15. A small air compressor 34 is incorporated in device 14 for supplying filtered compressed air to squeegee 50. The film 15 then passes around another idler roller 58 and around a fixer coating roller 59, which is coaxial with developer coating roller 51 as seen in FIG. 7, where a viscous fix is applied to the film emulsion through coating hopper 17 which is similar to coating hopper 16. The film 15 is then looped around the first of a pair of coaxial idler rollers 61 at the top of chamber 24, then around roller 62, which is coaxial with coating rollers 51, 59 (see FIG. 7), then back around the second idler roller 61, and then around idler roller 63 coaxial with roller 53 to form two film loops to provide a fixing time of approximately 12 seconds. The film 15 then passes around idler roller 64 into washing chamber 25. Prior to entering washing chamber 25, film 15 passes another high-velocity spray nozzle 65 as seen in FIG. 12 which removes the viscous fix coating from the film surface. The temperature of processing chamber 24 is indicated by a dial thermometer 66 which has its sensing bulb located within chamber 24.

Figures 8, 9, 10:
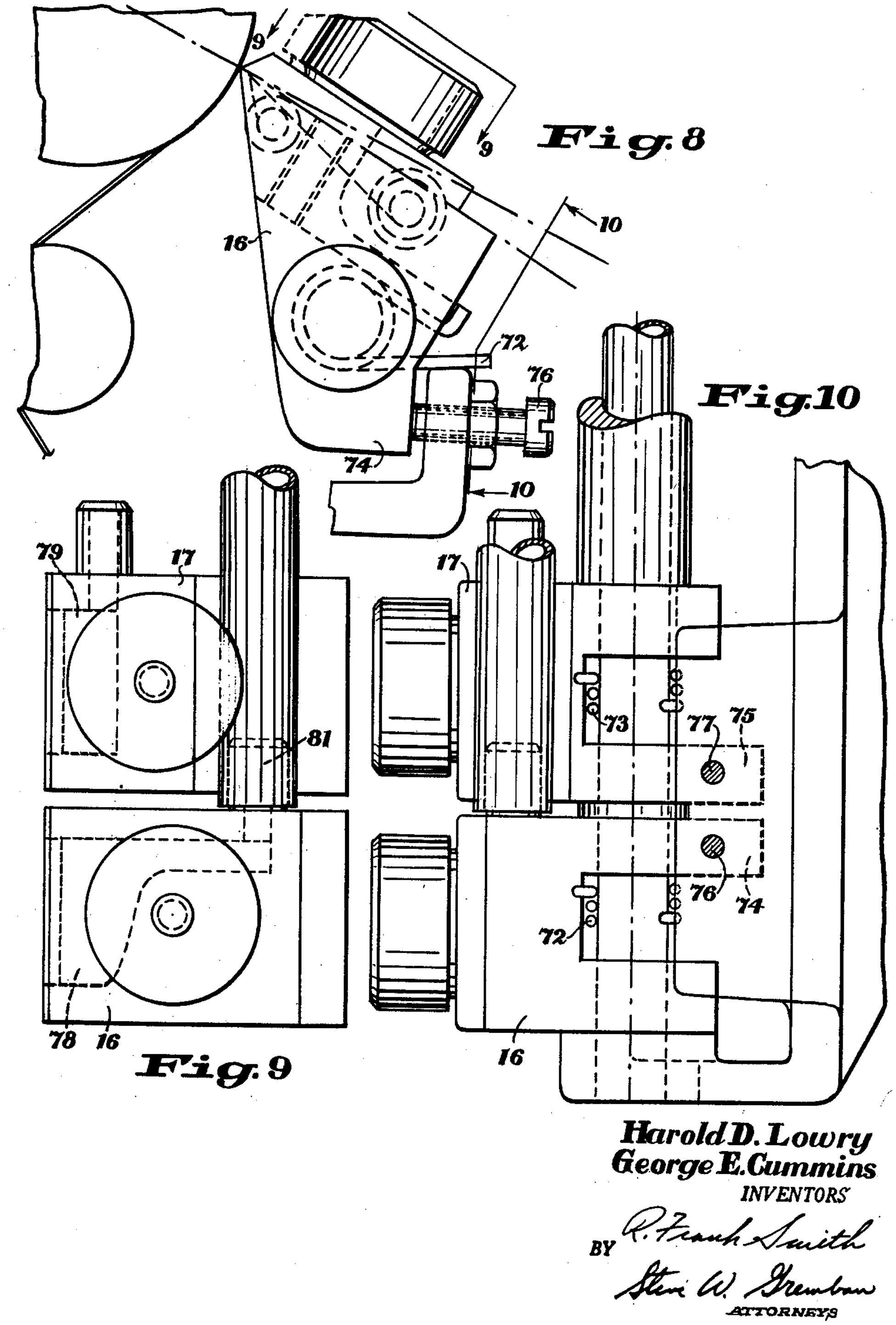
FIG. 8 is an enlarged front elevation view of a part of the viscous solution applicator mechanism of FIG. 6.
FIG. 9 is an elevation view of the structure of FIG. 8 looking at it from line 9—9.
FIG. 10 is a view similar to FIG. 9 looking at the structure of FIG. 8 from the line 10—10.

The coating rollers 51, 59 and hoppers 16, 17 are shown in greater detail in FIGS. 6–10, and essentially comprise a pair of parallel shafts 67, 68 having one of their ends fixed to a bracket 69 secured to the rear wall of processing chamber 24, and their opposite ends interconnected by an arm 71. The coating rollers 51, 59 are mounted in axially spaced relation on shaft 68, and the coating hoppers 16, 17 are pivotally mounted on shaft 67 in axial register therewith. Each of the hoppers 16, 17 has a respective spring 72, 73 as seen in FIGS. 8 and 10 for urging the hoppers in a counterclockwise direction causing respective projections 74, 75 extending therefrom to engage the end of set screws 76, 77. By adjusting the set screws 76, 77, the operator is able to adjust the gap or space between each hopper opening and film 15 at approximately .008 inch. Also, the angle of the hopper openings with respect to the coating surface of the rollers 51, 59 is adjusted, and in this particular application is set at 5° to a radial line of each roller 51, 59 passing through the hopper opening associated therewith. These dimensions are representative only for one specific application and are not meant to be limitations. The coating hoppers 16, 17 have two portions between which plastic shims, not shown, are clamped to form respective channels 78, 79. The cross-sectional area of the channels 78, 79 is less than that of the respective tubes 81, 82 introducing the solution to the hoppers 16, 17 so that the channels 78, 79 are always completely filled with solution, and the solutions flow out of the hoppers 16, 17 in a smooth ribbon having a cross-section essentially equal to the film width and approximately .008 inch thick, for this particular application.

The processing and washing chambers 24, 25 are separated in part by a partition as best seen in FIG. 2 comprising a fixed bracket 83 for slidably supporting a rectangularly shaped plate 84. The plate 84 has a stud 85 extending through an elongated slot, not shown, in bracket 83, and a nut 86 on stud 85 for adjustably positioning plate 84 in a selected position. The upper end of bracket 83 is spaced from the top of the processing and washing chambers 24, 25, and the lower end of plate 84 is spaced from the lower end of the processing and washing chambers 24, 25 so that the chambers are in communciation with one another at each end. The upper end of washing chamber 24 has a bracket 88 supporting a fixed shaft 87 upon which a pair of idler rollers 89 are mounted for separate rotation. A carriage 91 is provided at the lower end of washing chamber 25 having a flange 92 co-operating therewith for supporting a shaft 93 therebetween upon which a pair of separately rotatable idler rollers 94 are mounted. The film passes around the upper and lower rollers 89, 94 to form two helical loops with the emulsion surface of the film facing three, hollow, cone type spray nozzles 95. Hot water at approximately 130° F. and a pressure of 20 pounds per square inch from an external water supply source as seen in FIG. 12 is discharged through nozzles 95. The carriage 91 is slidably movable on a way 96 supported by the rear wall of washing chamber 25 to vary the length of the loops, and may be releasably secured to the way in any selected position by means of a lock nut 97 to provide an adjustable washing time ranging from 13 to 17 seconds.

The hot water discharged through wash nozzles 95, in addition to thoroughly washing film 15, serves the function of maintaining the atmosphere in processing chamber 24 saturated with water vapor at a temperature of approximately 125° F. This hot water in excess of 125° F. is discharged downwardly in washing chamber 24, and the action of the downwardly moving water causes the air to move downwardly. This downwardly moving air becomes heated and humidified, and then passes beneath plate 84 into processing chamber 24, upwardly through chamber 24, and then over bracket 83 and down through washing chamber 25 to complete the cyclic flow of air. In this cyclic fashion, the saturated 125° F. atmosphere is established and maintained in processing chamber 24. It takes approximately four minutes to attain the saturated 125° F. atmosphere in chamber 24 once the discharge of hot water, through nozzles 95 is commenced. To aid in maintaining this condition, the developing and washing chambers 23, 24 respectively have their outer walls insulated to minimize loss of heat therefrom.

Close control of the humidity and temperature in processing chamber 24 is very important since it is essential to maintain the wet bulb temperature in chamber 24 at a substantially constant value in order to insure control over the processing cycle and achieve reproducible results. This has been accomplished in this processing device by maintaining the atmosphere in chamber 24 in a substantially saturated condition, that is at essentially 100 percent relative humidity, and at a temperature of approximately 125° F. The saturated atmosphere prevents cooling of the developer coating by evaporation which would slow down development and give erratic and unreliable results. The saturated atmosphere is easy to achieve and control, and since the wet and dry bulb temperatures are the same in such an atmosphere, the operator merely needs to maintain one temperature. Also, the need for costly equipment to maintain chamber 24 at a substantially constant realtive humidity value less than 100 percent and at a substantially constant wet bulb temperature is eliminated.

Figure 11:
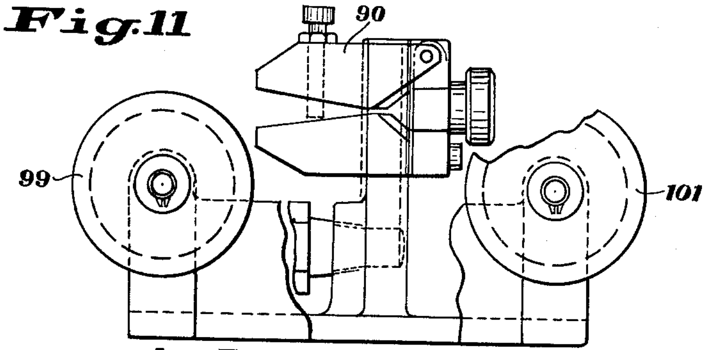
FIG. 11 is a front elevation view with portions broken away of a squeegee mechanism interposed between the processing and drying chambers.

The film 15 passes out of the upper end of washing chamber 25 through an exit slot 98, around roller 99, through air squeegee 90 as seen best in FIGS. 2 and 11, around roller 101, and passes into drying chamber 26. This air squeegee 90 is similar to squeegee 50, and also receives filtered compressed air from compressor 34. The drying chamber 26 also has a bracket 102 at its upper end co-operating with the rear wall to fixedly support a shaft 103 upon which three separately rotatable rollers 104 are mounted. The lower end of drying chamber 26 also has a carriage 105 having a flange 106 co-operating therewith to support a shaft 107 upon which three idler rollers 108 are mounted for separate rotation. The film 15 is threaded around the rollers 104, 108 to form three loops with the emulsion surface of the film facing a slotted plenum 109 through which warm air is directed under pressure against the film surfaces. The carriage 105 is slidably movable along a way 111 mounted on the rear wall of chamber 26 for adjustably varying the lengths of the loops, and hence adjusting the drying time within a range of 15 to 21 seconds. The plenum 109 discharges air at a velocity of about 2000 feet per minute against the film emulsion surface. The temperature of the heated air is thermostatically controlled over a range from ambient to 180° F.

Figure 3:
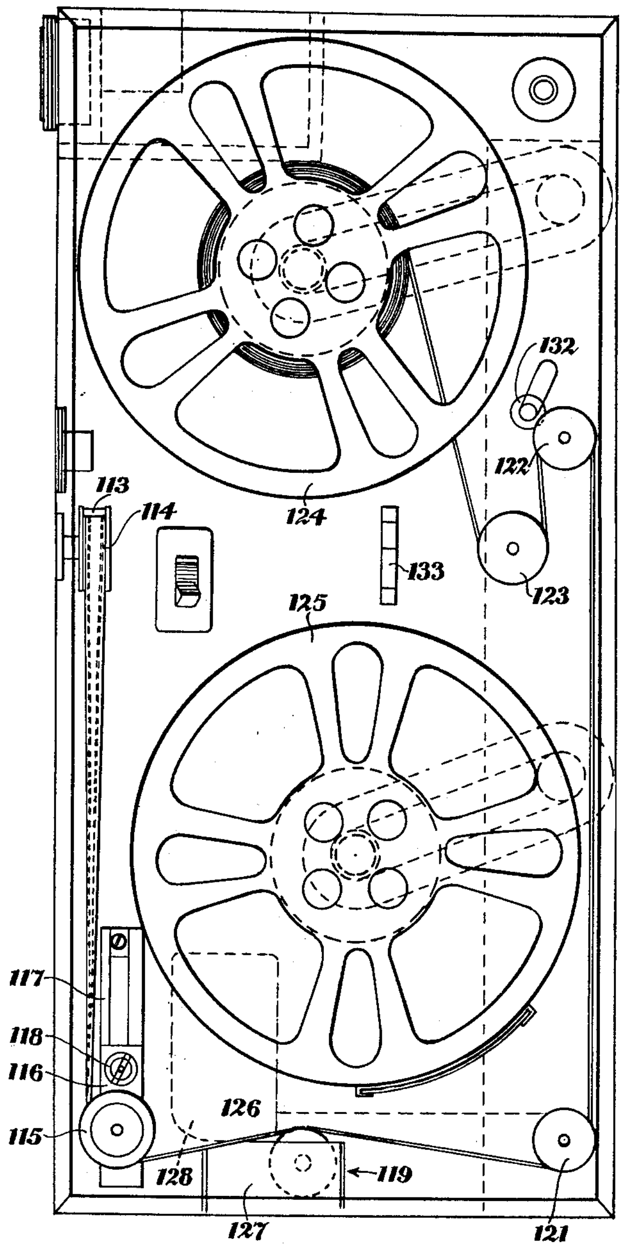
FIG. 3 is an enlarged segmental side elevation view of the windup section of the processing machine of FIG. 1.
Figure 4:
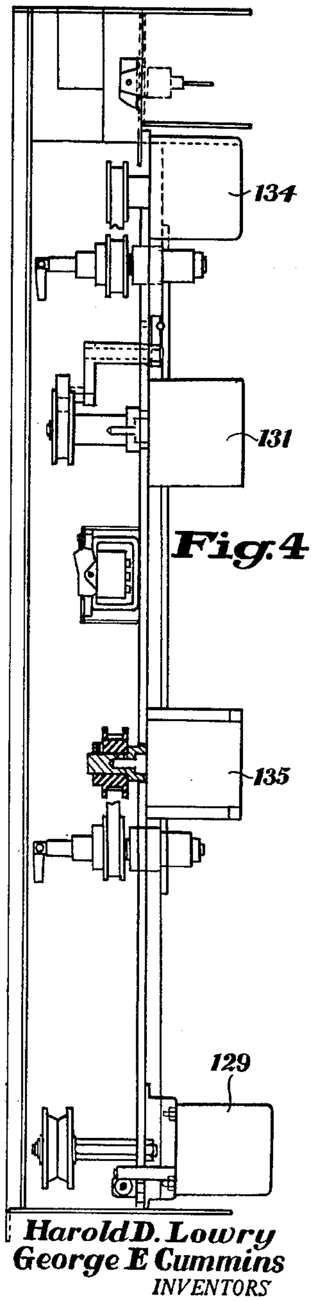
FIG. 4 is a side elevation view of the structure of FIG. 3 with the reels and film strip omitted.
Figure 13:
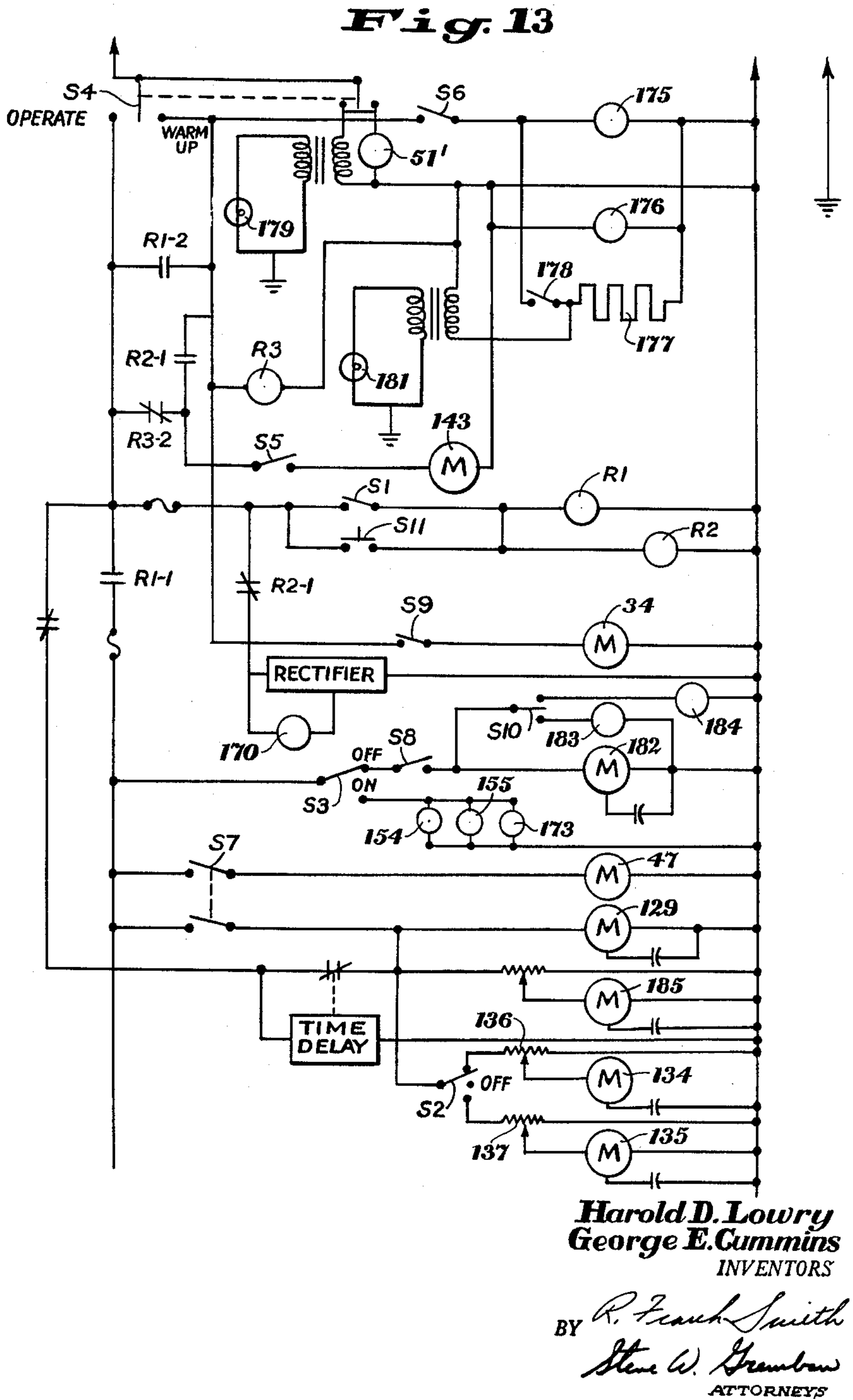
FIG. 13 is an electrical circuit diagram for the processing machine of this invention.

The film 15 leaves the drying chamber 26 over an idler roller 112 and passes through an exit slot 113 into windup chamber 27. The exit slot 113 is made sufficiently large so that a small flow of air passes from drying chamber 26 into windup chamber 27 to maintain a slight pressure in chamber 27 thereby excluding the entry of airborne dirt from the room into chamber 27. After entering windup chamber 27, the film 15 passes around an idler roller 114 and then is twisted through an angle of 90° before passing around an adjustably mounted idler roller 115, seen best in FIG. 3. The roller 115 is mounted on a carriage 116 which is slidably movable on a way 117 secured to the rear wall of drying chamber 27, and a lock nut 118 is provided for adjustably securing roller 115 in a selected position. After leaving roller 115, the film 15 passes over a film lubricating device 119, around an idler roller 121, around a pull-out or transport roller 122, and then around another idler roller 123 to one of two take-up reels 124, 125. The film lubricating device 119 is a conventional type for waxing the film emulsion surface, and consists of a plush-covered roll 126 which dips into a reservoir 127 containing a lubricant. The lubricant level in the reservoir is maintained by an inverted supply bottle 128. The plus-covered roll 126 is driven in a direction counter to the direction of the film travel by a separate motor 129. By varying the position of the adjustable roller 115, the operator can control the amount of lubrication applied to film 15. The pull-out roller 122 is driven by a small torque motor 131, and a pressure roller 132 urges film 15 into engagement with the periphery of pull-out roller 122 to minimize slippage. As indicated earlier, after passing pull-out roller 122, the film 15 can be selectively wound on either of two take-up reels 124, 125. A center-off, three-position switch S2 is used for actuating either reel 124, 125, and with this arrangement a filled reel of film can be removed from the machine without interrupting the processing cycle by moving switch S2 from one position into its "off" position, as seen in FIG. 13, stopping the reels. The pull-out roller 122 continues to transport film and forms a loop which can then be broken or cut by any commercially available cutting device 133, and the film end attached to the empty reel. The switch 52 can then be moved into another position to drive the empty reel while the filled reel is removed from windup chamber 27. The take-up reels 124, 125 are driven by separate torque motors 134, 135 respectively as best seen in FIGS. 3 and 4, and the torque of the motors are adjustable by respective autotransformers 136, 137 as seen in the wiring diagram of FIG. 13.

As indicated earlier, one of the advantages of the processing device of this invention is that it is adapted for continuous operation, and further, in the event of a shutdown for any length of time, it is possible to initiate processing within a matter of minutes. The matter of bringing a viscous solution processing device into operation after a period of shut down is normally an involved and lengthy process because the viscous solutions tend to harden and plug up the device. The novel system incorporated in processing device 14 for accomplishing continuous operation, if desired, and rapid return to processing following a period of shut down is best shown in FIG. 12. A sump 138 is located below processing and washing chambers 24, 25 for receiving the hot waste water from spray nozzles 54, 65 and 95. The sump 138 has an overflow weir 139, see FIG. 2, connected to a sump drain 141 for providing a specified level of hot waste water in sump 138. A conduit 142 connects the bottom of sump 138 to the intake of a motor driven centrifugal recirculating pump 143 which pumps some of the water from sump 138 through conduits 144, 145, and 146 to solution spray nozzles 54, 65, for removing the viscous developing and fixing solutions from film 15. The pump 143 further pumps some of the sump waste water through conduits 147, 148 and 149 to developer and fixer extrusion hoppers 16, 17 respectively. A manually operated shut-off valve 151 is interposed in conduit 147, and solenoid operated valves 152, 153 are interposed in respective conduits 148, 149 for preventing the waste water from flowing through hoppers 16, 17 until a switch 53 has been moved to its "on" position actuating solenoids 154, 155. With respect to the system for supplying the viscous developing solution to developer extrusion hopper 16, a flexible conduit 156 is shown having a probe 157 at one end insertable in container 33 of viscous developing solution, and the opposite end extending into the unfilled portion of a reservoir bottle 158. Another conduit 159 has one end extending into the portion of bottle 158 filled with solution, and the opposite end connected to metering pump 18. The output of metering pump 18 is connected through conduit 161, tempering coil 162 disposed in sump 138, and conduits 163, 149 to developer extrusion hopper 16. By this system, the action of metering pump 18 draws the solution from container 33 through reservoir bottle 158 where the air drawn through conduit 156 is trapped, and the solution is pumped out of pump 18 through heat exchanger coil 162 where the developer solution is heated to the temperature of the sump water of approximately 125° F., and then out of hopper 16 where it is extruded upon the film surface. The system for supplying the viscous fixing solution to fixer extrusion hopper 17 is substantially similar except no heat exchanger coil is incorporated therein for heating the fixing solution. As a result, the fixing solution is applied to film 15 at approximately ambient temperature. The parts in the fixing solution supply system that are similar to the parts in the developing solution supply system are indicated by the same numerals primed.

The hot water from the external water supply source seen in FIG. 12 is supplied through suitable conduits 164, 165, 166, 167 and 168 to wash spray nozzles 95, and to a plurality of clean-up spray nozzles 169. Manually and solenoid operated valves 171, 172 respectively are interposed in conduit 166, and a manually operated valve 174 is interposed in conduit 164. Valve 172, which is controlled by a solenoid 173, is movable, upon actuation of solenoid 173, from a normal position preventing the water from flowing to nozzles 169, to an open position permitting the water to flow for thoroughly cleaning processing chamber 24, assuming valves 171, 174 are opened. The solenoids 154, 155, 173 which control respective valves 152, 153, 172 are actuated by moving a clean-up switch S3 to its "on" position.

In the operation of this invention, let us assume initially that processing device 14 has been inoperative for several days, and the operators now desire to process some film. The device is provided with containers of viscous developer and fixer solutions, and the probes are inserted therein. Initially, the operator connects device 14 to the power supply causing blower 51′ to operate, building up a slight air pressure in feed chamber 23. The operator then opens the manually operated valves 151, 171 and 174 in the water supply system causing water to flow through nozzles 95. If the water pressure is of a sufficient value, pressure switch S5 will close. The air and dryer switches S9, S6 respectively, are moved into their "On" positions, and the control switch S4 moved to its "Warm Up" position. This connects power to air compressor 34 which is energized forcing air through air squeegees 50, 90. Power is also supplied to a resistance heater 177 controlled by thermostat 178 and blower motors 175, 176. While the temperature of the respective processing and drying chambers 24, 25 is coming up to value as controlled by thermostat 178 and indicated on a thermometer 66, which normally takes around 4 minutes, the operator moves control switch S4 to its "On" position and splices the film leader of a film which is to be processed to a leader which is always threaded through the machine upon completion of processing. The operator then moves the drive and pump switches S7, S8 respectively, to their "On" position, moves the control switch S4 to its "Operate" position, and momentarily presses the start button S11. Relay R1 is energized closing normally open contacts R1–1 and R1–2 and relay R2 is energized opening normally closed contact R2–1. Power is connected to the respective pacer, waxer, and pull-out torque motors 47, 129, 185 for transporting the film through device 14 for processing, waxing and wind-up. As soon as tension is built up in the film, roller 41 is lifted closing end-of-roll detector switch S1 bypassing start button S11. In addition, power is connected to a pump motor 82 for driving the viscous solution metering pumps 18, 19. Power is also connected to a timer switch S10 which controls a timer 183 and a buzzer 184. The timer 183 is set by the operator to actuate buzzer 184 when the chemical supply is about to run out. Relay R3 is energized closing normally open contact R3–1, and power is supplied through the now-closed contacts R1–2 and R3–1 to pump motor 143 which pumps sump water under pressure through nozzles 54, 65. Processing continues, and after the film is completely unwound from magazine 36, it loses its tension causing detector roller 41 to drop, opening the end-of-roll detector switch S1 causing relays R1 and R2 to be de-energized. This disconnects the power to pacer motor 47 stopping the transport of film, and connects the power to magnetic brake 170 of motor 47 to prevent the motor from overrunning by virtue of inertia, thereby feeding film in device 14 and causing slack to develop therein. The operator moves control switch S4 into the "Off" position, removes magazine 36, and splices the end of a leader to the end of the film. The control switch S4 is moved into its "Operate" position, and start button S11 pressed to transport the remaining portion of the film through the processing device 14 and to thread it with leader, which takes approximately 10 seconds. The operator then moves pump switch S8 to its "Off" position and clean-up switch S3 to its "On" position to clean out processing device 14 while the leader is being transported through device 14. This supplies power to the three solenoid-operated valves 154, 155 and 173 which are moved into their open position, permitting the water to flow under pressure through hoppers 16, 17 and spray nozzles 169 for cleaning out the hoppers, rollers, etc., mounted in processing chamber 24. The clean-up operation is continued for approximately 50 seconds, and then all of the switches are moved to their "Off" positions. The manually operated valves 151, 171 and 174 are closed and the processing device 14 is effectively shut down.

The invention has been described in detail with particular reference to a preferred embodiment thereof, but it will be understood that variations and modifications can be effected within the spirit and scope of the invention, as described hereinabove and as defined in the appended claims.

We claim:

1. In a device for processing a movable web by applying thereto a viscous processing solution from removable, collapsible containers, the combination comprising:

a hopper including means for extruding a uniform layer of viscous processing solution onto the surface of a web being transported through the device;

conduit means connected at one end to the hopper and including a hollow probe at the other end selectively connectable with a removable collapsible container of viscous processing solution to permit feeding of the solution from the container to the hopper, and on emptying of the container, connectable with another container to provide continuous operation;

positive displacement metering pump means on the conduit means between the hopper and the probe to continuously feed the viscous processing solution to the hopper at a predetermined rate; and air trap means on the conduit means between the pump means and the probe, the air trap means including means defining a reservoir partially filled with the viscous solution, a first conduit extending at one end to the reservoir portion unfilled with the processing solution and operatively connected at the other end to the portion of the conduit means adjacent the probe to permit viscous solution to feed into the reservoir from the container, and a second conduit having one end in the filled reservoir portion and operatively connected at the other end to the conduit means adjacent the pump means to permit feeding of solution from the filled reservoir portion to the hopper by the pump means.

2. The combination according to claim 1 and further comprising means intermediate the hopper and the pump means to heat the viscous processing solution to a predetermined temperature as it is fed to the hopper.

References Cited in the file of this patent

UNITED STATES PATENTS

| | | |
|---|---|---|
| 927,476 | Barker | July 13, 1909 |
| 1,910,088 | Cherry | May 23, 1933 |
| 2,548,573 | Wampole et al. | Apr. 10, 1951 |
| 2,618,409 | Eisenberger et al. | Nov. 18, 1952 |
| 2,681,294 | Beguin | June 15, 1954 |
| 3,001,525 | Hendricks | Sept. 26, 1961 |
| 3,094,914 | Smith | June 25, 1963 |